H. R. CARVETH.
APPARATUS FOR FUSING ELECTROLYTES.
APPLICATION FILED MAR. 19, 1910.
1,074,408.
Patented Sept. 30, 1913.
2 SHEETS—SHEET 1.
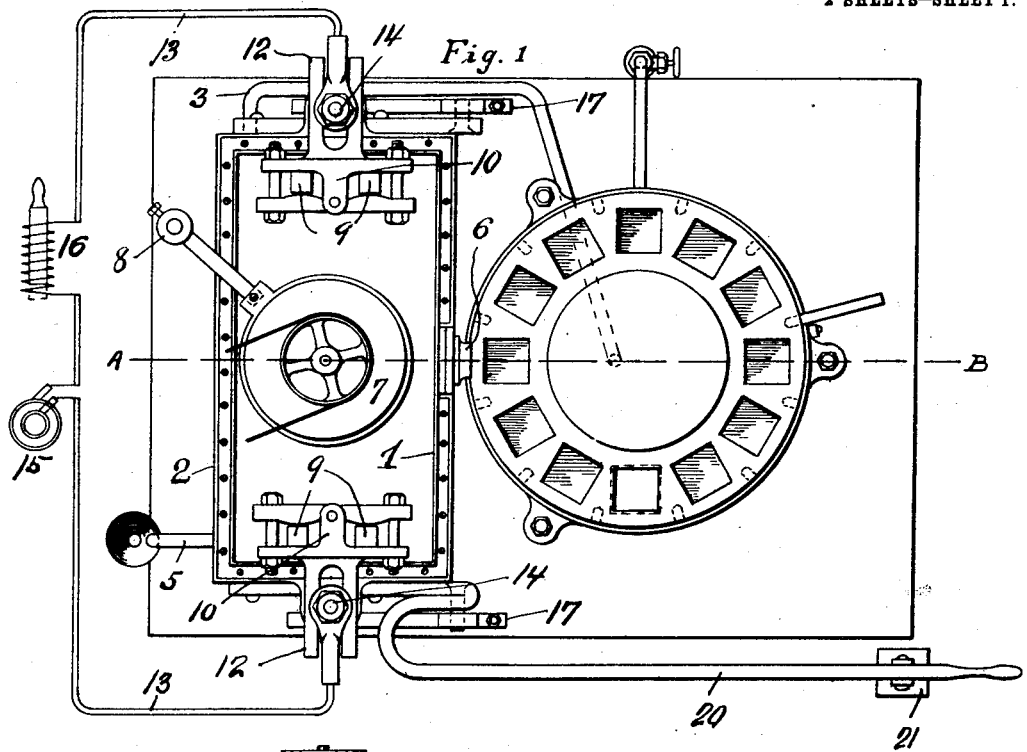
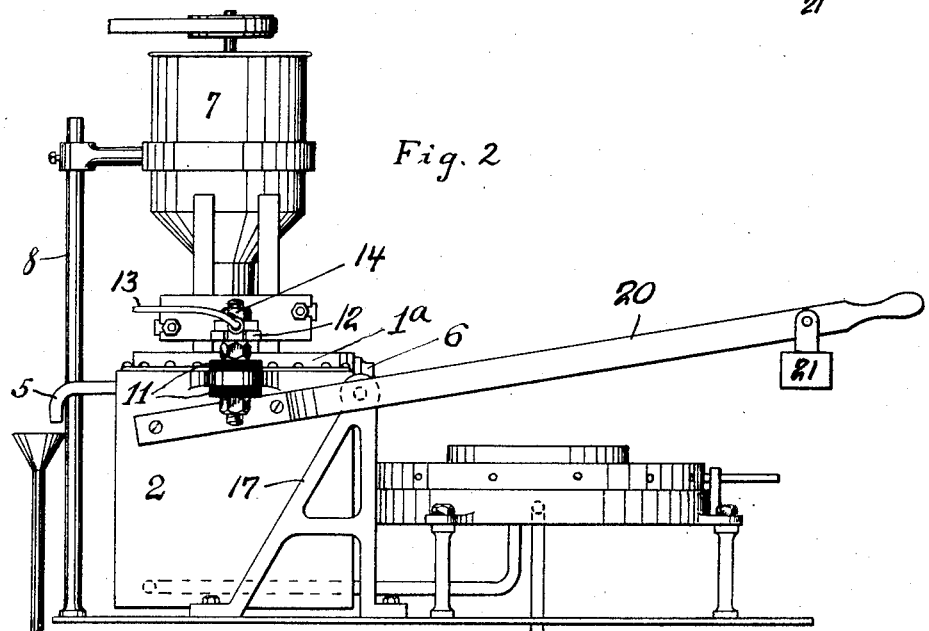

H. R. CARVETH.
APPARATUS FOR FUSING ELECTROLYTES.
APPLICATION FILED MAR. 19, 1910.
1,074,408.
Patented Sept. 30, 1913.
2 SHEETS—SHEET 2.
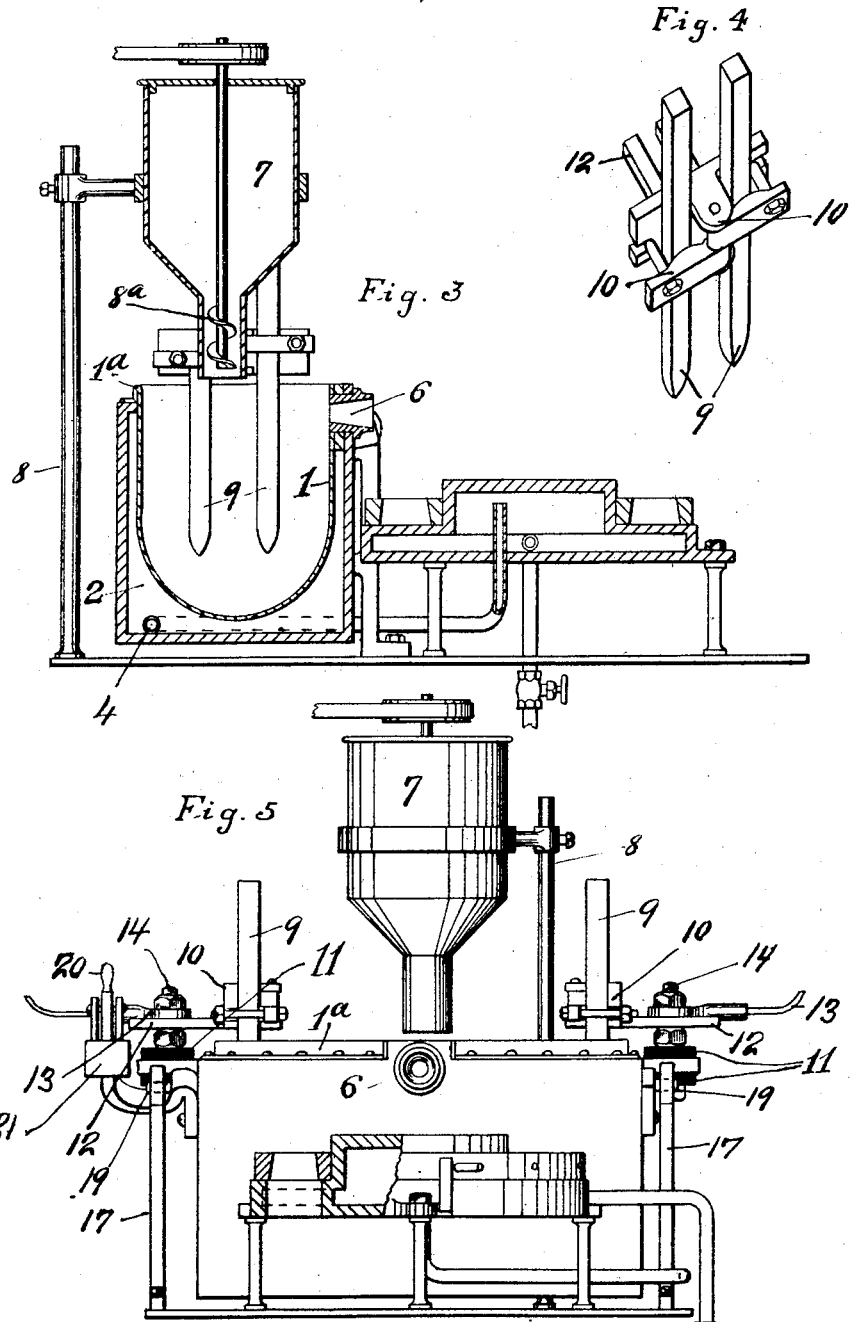
WITNESSES:
INVENTOR
BY
ATTORNEY

UNITED STATES PATENT OFFICE.

HECTOR RUSSELL CARVETH, OF NIAGARA FALLS, NEW YORK, ASSIGNOR TO THE ROESSLER & HASSLACHER CHEMICAL CO., OF NEW YORK, N. Y., A CORPORATION OF NEW YORK.

APPARATUS FOR FUSING ELECTROLYTES.

1,074,408.  Specification of Letters Patent.  Patented Sept. 30, 1913.

Application filed March 19, 1910. Serial No. 550,472.

*To all whom it may concern:*

Be it known that I, HECTOR RUSSELL CARVETH, a citizen of the United States, residing at Niagara Falls, in the county of Niagara and State of New York, have invented certain new and useful Improvements in Apparatus for Fusing Electrolytes, of which the following is a specification.

My invention relates generically to an apparatus in which an electrolyte may be fused by the agency of an electric current passed through it and specifically to certain improvements I have made in such apparatus to render the same more successful, efficient and economical in commercial operation.

Some inorganic compounds when fused even without being subjected to chemical reaction are found to be capable of new uses. Among these, for example, are the peroxids of the alkaline metals. These are ordinarily found in trade as fine powders; after fusion, however, they appear as hard masses which on contact with water liberate oxygen with the greatest readiness. These bodies when in a fused state attack violently the walls of almost any container in which they may be confined; to avoid this it has been proposed to make use of their power for conducting electricity to fuse them by the agency of the electric current, using as the container a water jacketed furnace, as is shown, for example, in U. S. Patent No. 884,563 issued to George Fred Brindley, April 14, 1908.

Corrosive materials of the character described were fused according to the Brindley process but because the electrodes were destroyed by the action of the fused electrolyte, the furnace could not be operated without serious disadvantages. When an electrode had been worn to its limit of usefulness, it was necessary to cut off the supply of electrical energy, remove the electrode, cut out the solidified previously fused bath to replace the electrode, and, after replacement, again to throw on the current and effect the fusion. This made the process expensive and highly objectionable because of the danger to the operator, the loss of time, current interruption and waste and variation in composition of the fused material.

To overcome those difficulties I have devised an apparatus in which the electrodes and electrode connections are so designed that the adjustment or removal of electrodes is permitted without interruption of the current or of any operation of the fusion furnace. By this means the process of fusion may be maintained without interruption, whereas with any other method an interruption would have to be made every few hours. I have also found it necessary to be able to vary the amount of electrical energy consumed in the melting pot and to control it both in regard to the total amount of heat supplied to the fused bath and in regard to the current density at the electrodes. This control is obtained by adjusting the electrodes as above mentioned, by varying the depth and other dimensions of the bath and by proper regulation of the current in the supply circuit outside of the bath. By this means it is possible so to control the electric current that the temperature of the fused bath may be kept as desired.

In the following I have described, in connection with the accompanying drawings one means of carrying out my invention, the features thereof being more particularly pointed out hereinafter in the claims.

The accompanying drawings illustrate an apparatus which may be used in fusing electrolytes which have stable melting points.

Figure 1 is a plan view of the apparatus. Fig. 2 a side elevation. Fig. 3 a transverse vertical section along line A B of Fig. 1. Fig. 4 illustrates the electrodes and electrode holder. Fig. 5 is a front view of the apparatus, the water table and mold being given in partial section to show the method of emptying the mold.

The apparatus which I employ for melting electrolytes uses as a container a water jacketed chamber within which the electrolyte is melted by heat generated from the electrical energy utilized in the chamber; in order to make the operation continuous, safe and commercially successful the electrodes and electrode connections, the control of water supply into and out from the jacket, the feeding of the unfused electrolyte and the removal of the fused material from the bath by tilting or by displacement must be carefully considered and correlated.

In all drawings, like numerals designate like parts.

1 represents the walls of a melting chamber; in plan this is rectangular as shown in Fig. 1, in section bowl shaped, as shown in Fig. 3. This chamber may be open at the top. It is made of metal, preferably copper. Melting chamber 1 is set within a water jacket 2 and is so connected to it that water leakage into the chamber 1 cannot occur as, for instance, by forming outwardly turned flanges 1ª, around the upper edge of chamber 1 adapted to rest upon and be fastened to similar inwardly turned flanges around the upper edge of the water jacket. A washer may be interposed the two flanges if desired. Through the walls of 1 and 2 passes a spout 6 through which the fused electrolyte may be poured when the furnace is tilted.

Water or other cooling agent is passed through pipe 3 and a suitable flexible connection (not shown), into the lower part of the water jacket as at 4, the water, after surrounding the outer walls of the inside chamber, flowing off through pipe 5. The unfused electrolyte, such as sodium peroxid, may be stored in hopper 7 which is supported above the furnace by standard 8. While the drawings illustrate a method of feeding by means of a mechanically driven screw 8ª, I do not restrict myself to this method of delivering the unfused material to the bath. Electrical energy is delivered to the bath by means of electrodes 9; these may be raised or lowered by means of the adjusting holders 10 by which they are supported and with which they are in close electrical contact. Electrical connection between arms 12 of the electrode holders and the flexible cables 13 which carry the current may be made by means of a bolt and nut connection 14; the last may be rigidly attached to the casing of the water jacket but must at the same time be electrically insulated from the same by insulating bushing and washers 11. The cables 13 are attached to a source of alternating current 15 which is preferably of high frequency; 16 indicates one method of controlling the amount of current supplied by means of an inductive resistance in the external circuit. I do not restrict myself to this method of controlling the supply of electrical energy since other methods may be used which are well known to those skilled in electrical engineering.

For purposes of convenient handling, the complete melting furnace may be mounted on standards 17. These may have at their upper end bearings for a trunnion 19. A lever 20 projecting toward the furnace operator and supplied with a counterpoise 21 may be attached to the water jacket in such a way that the furnace may be tilted on its trunnion 19 by bearing downward on lever 20.

The operation of the furnace may be described as follows: The electrolyte to be fused may be placed in the water jacketed melting chamber to the depth of several inches. The melting may be started by drawing an arc between the electrodes. As the electrolyte melts and conducts the current, the current in the external circuit is regulated and more unfused material fed in. When sufficient material has been melted the furnace may be tilted and some of the fused product poured into a mold of the desired shape. The process of addition of the unfused material and removal of the fused mass may be either continuous or discontinuous according to requirement.

It is obvious that the details of construction may be varied without departing from the spirit of my invention and I do not wish to be restricted to the details as shown and described.

What I claim and desire to secure by Letters Patent is:

1. An apparatus for fusing electrolytes by means of the electric current comprising a melting pot, means for cooling the walls of said pot, a plurality of groups of horizontally and vertically adjustable electrodes dipping into the fused mass in said pot, means connecting said electrodes to a source of electricity and means for adjusting and replacing said electrodes without interruption of the electric current comprising an electrode holder having independently operable electrode clamping means pivotally connected thereto.

2. An apparatus for fusing electrolytes by means of the electric current comprising a melting pot having out-turned flanges, a water jacket therefor having correspondingly inturned flanges, means for feeding the unfused material into said pot, a plurality of groups of horizontally and vertically adjustable electrodes of opposite polarity dipping into the fused mass in said pot, means connecting said electrodes to a source of electricity, means for adjusting and replacing said electrodes without interruption of the electric current, and means for removing the fused product.

3. An apparatus for fusing electrolytes by means of the electric current comprising a melting pot having out-turned flanges, a water jacket therefor having correspondingly inturned flanges, means for feeding the unfused material into said pot, a plurality of groups of horizontally and vertically adjustable electrodes of opposite polarity dipping into the fused mass in said pot, means connecting said electrodes to a source of electricity, means for adjusting and replacing said electrodes without interruption of the electric current and means for tilting the said pot so that the fused product may be delivered from said melting pot as desired.

4. An apparatus for fusing electrolytes by means of the electric current comprising a melting pot, means for cooling the walls of said pot, means for feeding the unfused material into said pot, a plurality of groups of horizontally and vertically adjustable electrodes of opposite polarity dipping into the fused mass in said pot, means for adjusting and replacing said electrodes without interruption of the electric current comprising an electrode holder having independently operable electrode clamping means pivotally connected thereto, means for controlling the supply of electrical energy and means for the intermittent removal of the fused product.

5. An apparatus for fusing electrolytes by means of the electric current comprising a melting pot, means for cooling the walls of said pot, means for delivering the unfused material into said pot, terminals attached to a source of electrical energy, means for supporting said terminals on said melting pot but electrically insulated therefrom holders in electrical connection with said terminals, a plurality of electrodes connected to each of said holders said electrodes being independently adjustable with reference to each other and dipping into the fused conductor in said pot, means for controlling the supply of electrical energy and means for the intermittent removal of the fused product.

In testimony whereof I have signed this specification in the presence of two subscribing witnesses.

HECTOR RUSSELL CARVETH.

Witnesses:
WILLIAM FRANCIS FLAHERTY,
JAMES CLOYD DOWNS.